United States Patent [19]

Hino

[11] Patent Number: 4,864,831
[45] Date of Patent: Sep. 12, 1989

[54] ICE STORAGE REFRIGERATING APPARATUS OF DIRECT CONTACT TYPE

[75] Inventor: Toshiyuki Hino, Chofu, Japan

[73] Assignee: Kajima Corporation, Tokyo, Japan

[21] Appl. No.: 217,391

[22] Filed: Jul. 11, 1988

Related U.S. Application Data

[62] Division of Ser. No. 44,471, May 1, 1987.

[30] Foreign Application Priority Data

May 16, 1986 [JP] Japan .................. 61-110571
May 16, 1986 [JP] Japan .................. 61-110572
May 16, 1986 [JP] Japan .................. 61-148182

[51] Int. Cl.$^4$ .............................................. C02F 1/22
[52] U.S. Cl. ............................................. 62/123; 62/534
[58] Field of Search ............ 62/59, 99, 123, 532–534, 62/541; 252/67

[56] References Cited

U.S. PATENT DOCUMENTS

| | | | |
|---|---|---|---|
| 3,126,334 | 3/1964 | Harlow | 62/533 X |
| 3,132,096 | 5/1964 | Walton | 62/533 X |
| 3,247,678 | 4/1966 | Mohlman | 62/534 |
| 3,385,074 | 5/1968 | Aronson | 62/541 X |
| 4,164,854 | 8/1979 | Martin | 62/533 X |

FOREIGN PATENT DOCUMENTS

2300468 7/1973 Fed. Rep. of Germany ........ 62/534

*Primary Examiner*—William E. Tapolcai
*Attorney, Agent, or Firm*—Oldham & Oldham Co.

[57] ABSTRACT

An ice storage refrigerating apparatus of direct contact type comprises a closed crystallizer tank containing water therein and a refrigerant circulating system. A refrigerant consisting essentially of a hydrocarbon having four carbon atoms and/or a hydrocarbon having five carbon atoms is brought into direct contact with the water contained in the crystallizer tank to form ice in sherbet form which is used for heat exchange to provide chilled water used for air conditioning.

9 Claims, 10 Drawing Sheets

ICE STORAGE REFRIGERATING APPARATUS OF DIRECT CONTACT TYPE

This is a division of application Ser. No. 044,471, filed May 1, 1987.

TECHNICAL FIELD

This invention is generally utilized in apparatus producing chilled water for use in air conditioning and production processes.

BACKGROUND ART

Cool storage type air conditioners are now put into practical use in which refrigerators are operated in the nighttime for the purpose of leveling daytime and nighttime loads.

Although chilled water has been commonly used as a cool storage medium, attention has recently been directed to the use of ice. This is because, when the latent heat of fusion (80 Kcal/kg) of ice is utilized, the volume of a cool storage apparatus can be greatly decreased (usually less than 1/5 of the volume required hitherto).

However, a conventional ice maker heat pump which requires a heat-exchange bank (such as an ice maker coil) for heat exchange between a cooling medium (such as a refrigerant or an antifreezing solution) and water has had the following defects among others:

1. The evaporation temperature of the refrigerant in the refrigerator is low ($-6°$ C. to $-18°$ C.), and the operation efficiency (the coefficient of performance) is low.

2. The ice maker heat exchanger is bulky, resulting in a high cost.

To solve such problems, an ice making process of direct contact type (as, for example, disclosed in U.S. Pat. No. 3,838,577) has been proposed in which a refrigerant insoluble to water (a Freon or a hydrocarbon in most cases) is introduced into water and flashed into vapor to form ice crystals in the water. In conjunction with a process of turning sea water into fresh water (by freezing), crystallization was practically tested (4th International Symposium on Fresh Water from the Sea, Vol. 3, 371–382, 1973).

Applications of ice maker heat pumps to air conditioners were also proposed (Residential 182–187, A NEW CONCEPT FOR THE ICE MAKER HEAT PUMP), and development for practical use has also been attempted.

A heat exchange process of direct contact type similar to that described above uses cool storage by a clathrate (which is an inclusion compound of water and is also called a gas hydrate) in lieu of ice (Chemical Engineering, August 1982, pp. 31–36).

However, none of applications of the ice maker heat pumps to air conditioners have been successfully put into practical use.

The reasons are as follows:

(i) In the case of ice storage according to a heat exchange process of direct contact type proposed or attempted hitherto, a crystallizer and an ice bank have been separately provided, and ice slurry produced in the crystallizer has had to be continuously transferred to a storage tank (Residential 182–187). In this system, however, fine droplets of the portion of the refrigerant which has not been vaporized migrate toward the ice bank together with the ice crystals. Therefore, the prior art system has been defective in that the quantity of the refrigerant (R114, C318, or the like) constituting the refrigeration cycle becomes insufficient to continue the operation. Further, the prior art system has also been defective in that requirements of two tanks, ice slurry piping, ice slurry pumps, etc. lead to a complicated structure.

(ii) In the case of clathrate storage, a refrigerant is taken into crystal lattices of water molecules when a clathrate is formed. Therefore, the quantity of the enclosed refrigerant (R12 or the like) is very large (about ⅓ of that of water) and amounts to the order of tons even in a building of small scale.

Thus, there are still many problems to be solved from the aspects of cost and safety.

Further, a refrigerant which forms a clathrate has generally a small molecular weight and a high vapor pressure (6.6 kgf/cm$^2$ absolute at 25° C. in the case of R12). Therefore, a refrigerant container capable of withstanding a high pressure is required, resulting in a high equipment cost.

Based on an experiment of clathrates and also on the above consideration, the inventor proposed a new ice maker heat pump in Third Annual Workshop on Ice Storage for Cooling held at Argonne National Laboratory on Nov. 21–22, 1983, sponsored by the Department of Energy of U.S.A. In this proposal, a refrigerant having a large molecular size (more than 7 Å, R114 herein) is selected so as not to form a clathrate, although the structure of the heat pump is similar to that of the clathrate-forming heat pump.

Intended advantages of the proposed system are as follows:

(a) The refrigerant acts only as a working fluid for a refrigeration cycle, and its quantity to be charged is small (almost equal to that required in a common refrigerator).

(b) The heat transferability is satisfactory since ice is made by direct contact heat exchange. Therefore, the refrigerant can be vaporized at a temperature ($-2°$ C. to $-1°$ C.) lower than the freezing temperature of water, and the coefficient of performance can be improved.

(c) Chilled water (whose temperature is preferably 5° C. to 7° C.) to be supplied to an air conditioner is cooled by a heat exchanger provided in a tank. (The heat exchanger may be provided outside of the tank.) Since the temperature of ice is 0° C., there is a sufficient temperature difference for heat exchange.

In contrast, the clathrate has a high melting point (which is between 4° C. and 12° C. and which differs depending on the refrigerant). Therefore, the clathrate is suitable to provide a sufficient temperature difference for heat exchange.

(d) The tank is gastight, and no oxygen gas is substantially present in the tank. Therefore, no rust occurs even when the tank is made of an inexpensive steel material.

However, later researches and studies have proved that the liability of Freons (halogeno-hydrocarbons) to hydrolysis is a vital defect. That is, hydrolysis of halogeno-hydrocarbons produces reaction products such as hydrogen chloride (hydrochloric acid), hydrogen fluoride (hydrofluoric acid), etc., and the presence of even a very slight quantity of such reaction products gives rise to danger of corroding the tank, compressor, heat exchanger, etc. Further, even when the rate of hydrolysis is very slow, the adverse effect of accumulation of such reaction products during a long time of use (more than 10 years) of the system in a closed state cannot be ignored.

Based on the finding described above, the present invention contemplates to provide an improved ice storage refrigerating apparatus of direct contact type.

A primary object of the present invention is to provide an ice storage refrigerating apparatus of direct contact type comprising a closed crystallizer tank containing water therein, and a refrigerant system including means for cooling to condense a refrigerant of gas form consisting essentially of a hydrocarbon having four carbon atoms and/or a hydrocarbon having five carbon atoms, means for bringing the condensed refrigerant gas into direct contact with the water to form ice in sherbet form, and means for circulating the refrigerant gas from the top of the crystallizer tank to recover the refrigerant.

Another object of the present invention is to provide the ice storage refrigerating apparatus of direct contact type described above, wherein the refrigerant system includes nozzle means disposed in a lower part of the crystallizer tank for ejecting the condensed refrigerant gas into the water contained in the crystallizer tank.

Still another object of the present invention is to provide an ice storage refrigerating apparatus of direct contact type comprising a closed crystallizer tank containing water therein, and a device for directly ejecting a refrigerant consisting essentially of a hydrocarbon having four carbon atoms and/or a hydrocarbon having five carbon atoms into the water contained in the crystallizer tank thereby forming ice in sherbet form, the device comprising pipe means having an open upper end located adjacent to the water level in the crystallizer tank and an open lower end located in a lower part of the crystallizer tank, and nozzle means extenting into the pipe means for ejecting the refrigerant therefrom.

Yet another object of the present invention is to provide an ice storage refrigerating apparatus of direct contact type comprising a gastight crystallizer tank enclosing therein water and a refrigerant substantially insoluble to the water, a condenser disposed in an upper space of the crystallizer tank and cooled by an external refrigerator for condensing the refrigerant, and sprinkler means disposed in the upper space for sprinkling the liquid pumped out from the bottom part of the crystallizer tank and fed through conduit means, the refrigerant dropping in liquid form from the condenser and the liquid pumped out from the bottom part of the crystallizer tank being mixed together on the liquid level in the crystallizer tank to form ice in particle form.

The peculiar character of the present invention, as well as other objects, features and advantages of the present invention, will become apparent from the following detailed description taken in conjunction with the accompanying drawings.

DESCRIPTION OF THE PREFERRED EMBODIMENTS

Figure 1A:
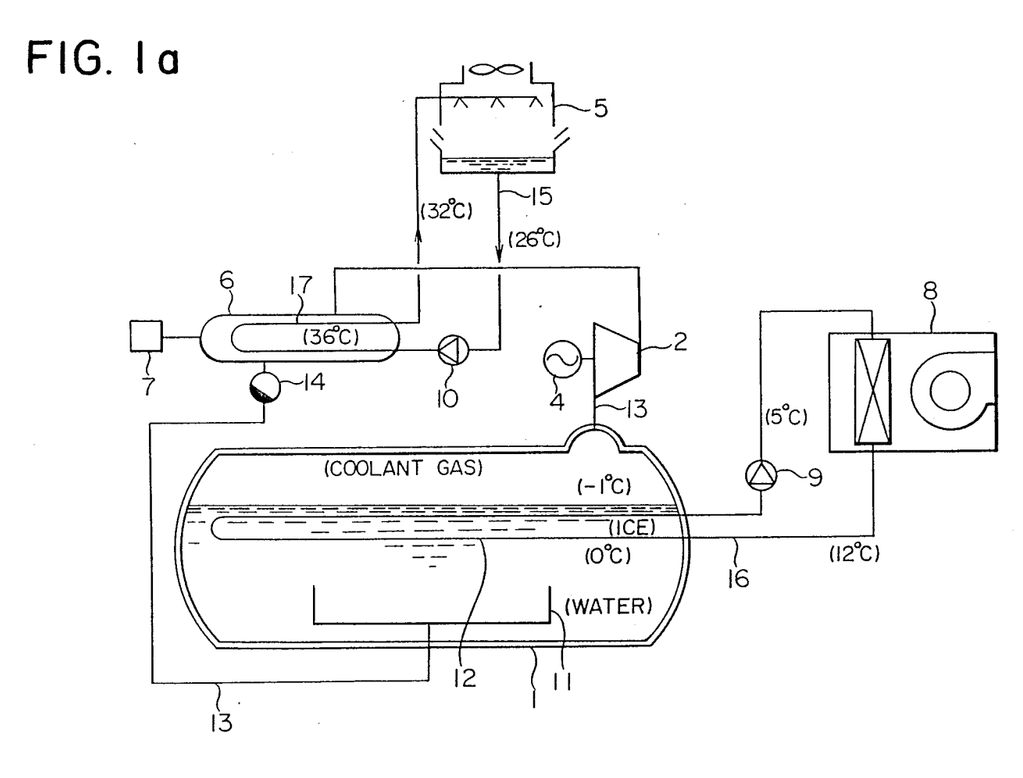
FIG. 1a is a system diagram of a first embodiment of the ice storage refrigerating apparatus of the present invention.

FIG. 1a shows a first embodiment of the present invention. A crystallizer tank 1 is of a closed type of steel construction, and its outer surface is thermally insulated by a thermal insulating material. Water is contained in this crystallizer tank 1 in a relation which will leave an upper inner space in the tank 1 as shown. Gas of a refrigerant described later is filled in this space.

A refrigerant conduit 13 for discharging the refrigerant gas is connected to the top of the crystallizer tank 1, that is, to a dome-like projection of the tank 1 in the case of this embodiment. An oil-free type compressor 2 driven by a motor 4 is connected to this refrigerant conduit 13, and a condensor 6 is connected to the outlet of the compressor 2. A heat exchanger 17 is connected to a cooling system composed of a cooling tower 5, a cooling water pump 10 and a cooling water conduit 15. Refrigerant gas cooled by the heat exchanger 17 is condensed by the condenser 6, and the condensed refrigerant gas is fed through a gas trap 14 acting as an expanding unit to refrigerant jet nozzles 11 disposed in the crystallizer tank 1. Reference numeral 7 designates an air extraction device. This air extraction device 7 is provided to purge air leaking through seals, etc., because the interior of the crystallizer tank 1 is to be normally maintained at a negative pressure.

The refrigerant jet nozzles 11 open into the water contained in the crystallizer tank 1 to eject the refrigerant into the water, thereby turning the ambient portion of the water into ice in sherbet form.

Another heat exchanger 12 is disposed in the crystallizer tank 1 and is connected to a water conduit 16 at the outside of the tank 1. A chilled water pump 9 is provided in the water conduit 9, and chilled water obtained by heat exchange by the heat exchanger 12 disposed in the crystallizer tank 1 is fed to an air conditioner 8 by the chilled water pump 9.

This embodiment employs a refrigerant consisting essentially of a hydrocarbon having four carbon atoms or a hydrocarbon having five carbon atoms of their mixture. An especially preferable refrigerant is normal-pentane. This normal-pentane is insoluble to water, does not react with water, is not toxic, is chemically stable (is not decomposed) and is inexpensive. The normal-pentane does not produce a clathrate. Methane, ethane, propane and the like, which are also hydrocarbons, are not preferable because they produce hydrates. Isobutane produces a hydrate too. However, when isobutane is mixed with a hydrocarbon having a molecular size larger than that of isobutane (for example, pentane, cyclopentane), the mixture does not produce a hydrate.

This is the reason why the refrigerant must be hydrocarbon in which the number of carbon atoms is four or more.

Another requirement is that the saturation pressure of this hydrocarbon at 0° C. is not excessively low. When the saturation pressure of the hydrocarbon at 0° C. is less than, for example, 100 Torr (13 kPa), a compressor of excessively large size is required, giving rise to such a technical problem that the compressor efficiency is lowered. This is the reason why a hydrocarbon having more than five carbon atoms is not suitable for use as the refrigerant.

The greatest defect of hydrocarbons when used as a refrigerant is the inflammability. This danger can be reduced by selecting a low-pressur refrigerant so that refrigerant gas may not blow out from a container even when, for example, cracking occurs on the container.

For example, the boiling point of isopentane at the atmospheric pressure is 28.0° C., that of normal-pentane is 36.1° C. and that of cyclopentane is 49° C.

Especially, in the case of the normal-pentane, the safety is high since a pressure lower than the atmospheric pressure is maintained even in the high pressure part (the condenser) of the refrigeration cycle. Also, the pressure of the low pressure part (the evaporator) is 0.24 atmospheres (188 Torr=25 kPa) at 0° C., and such a pressure can be dealt with by a conventional compressor.

The compressor 2 is of an oil-free type in which no lubricating oil need not be supplied to its cylinder. Beside the above type, a reciprocating type, a screw type, a rotary type, a centrifugal type or the like can also be utilized.

Operating temperatures of various parts, when normal-pentane is used as the refrigerant, are shown in parentheses in FIG. 1a, by way of example.

Hydrocarbon gas evaporated in the crystallizer tank 1 need not necessarily be compressed for condensation.

Figure 1B:
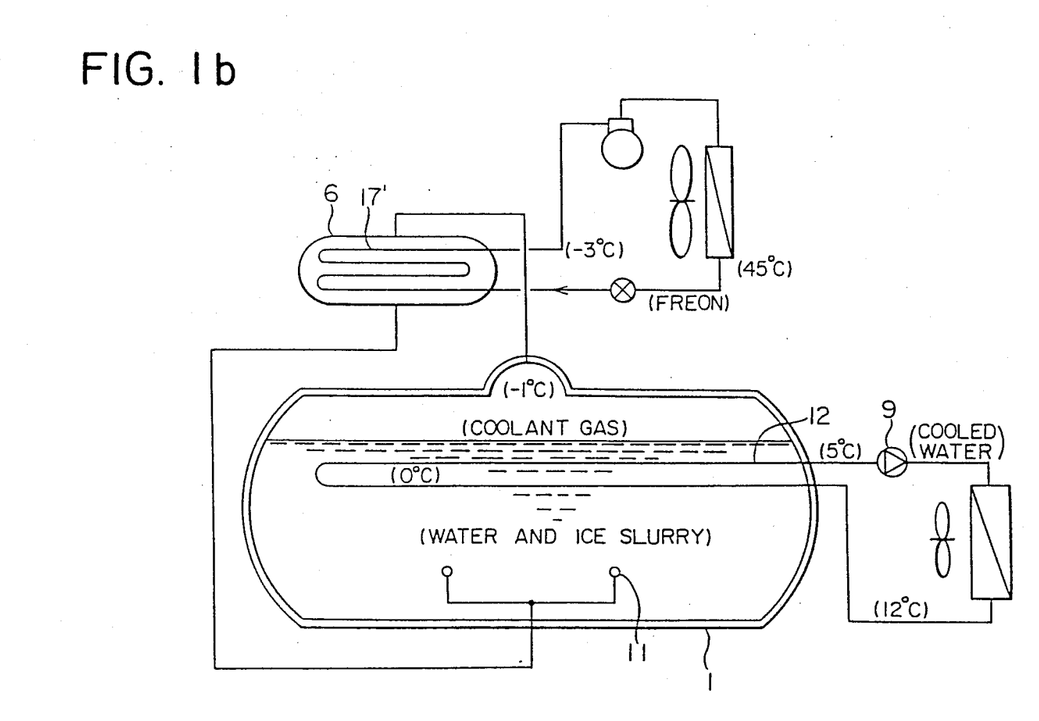
FIG. 1b is a system diagram of a modification of the first embodiment.

FIG. 1b shows a modification in which a conventional Freon refrigerator using a Freon (for example, R22) is used in the refrigeration cycle.

Gas of the hydrocarbon refrigerant such as pentane is condensed on the outer surface of a Freon evaporation coil, and the liquefied hydrocarbon refrigerant is discharged into the water and evaporated to produce ice slurry.

This modification is disadvantageous from the aspect of efficiency since a heat exchanger 17' is provided for heat exchange between the hydrocarbon refrigerant and the Freon refrigerant. However, since the efficiency of heat transfer during condensation and evaporation of the hydrocarbon refrigerant is very high, the heat exchanger 17' of small size can operate with high performance.

Any crystallizing coil need not be provided in the crystallizer tank 1. Thus, the advantages (the low cost and the high performance) of the present invention are still maintained.

The Freon refrigerator is mass-produced and inexpensive. In the modification shown in FIG. 1b, the hydrocarbon liquid is discharged into the water by gravity. However, when the pressure for discharging the hydrocarbon liquid into the water is insufficient, the liquid may be forcedly discharged by, for example, a pump. Further, an agitator or the like may be provided in the crystallizer tank 1 to agitate the water so as to improve the rate of transfer of heat between the hydrocarbon and the water.

In the modification shown in FIG. 1b, the heat of compressed Freon gas is radiated by an air-cooled condenser. However, this waste heat may be utilized for hot water supply or heating.

Figure 2:
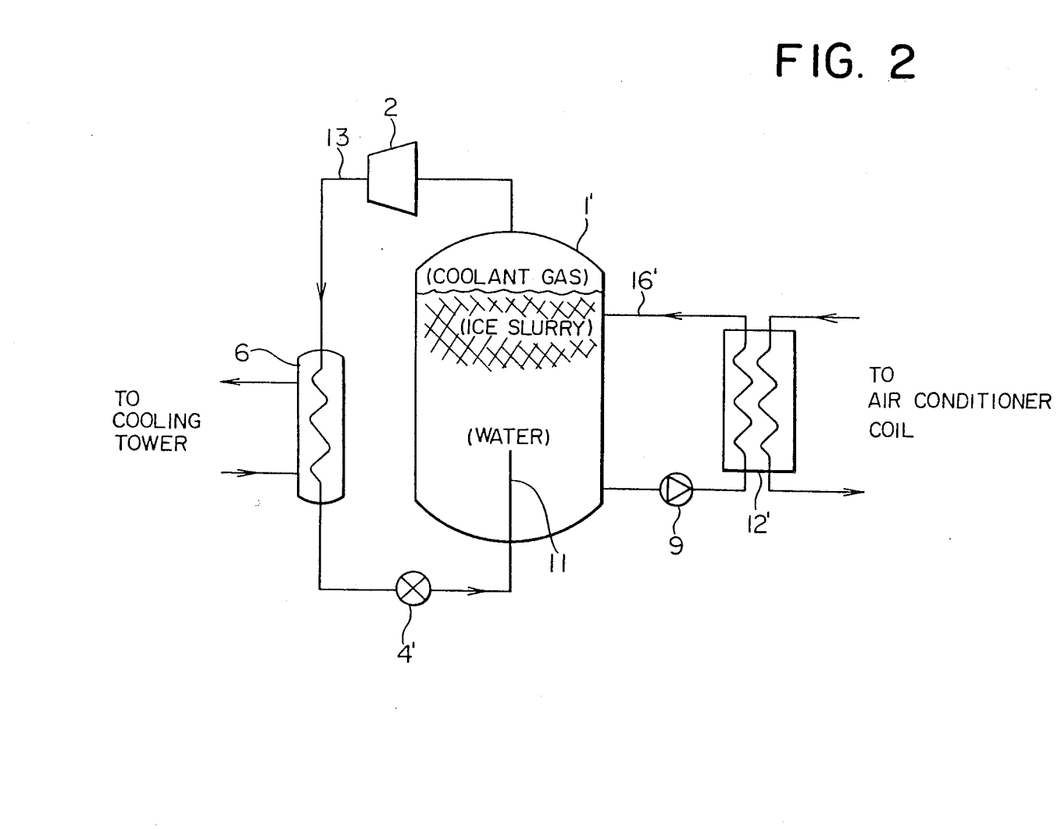
FIG. 2 is a system diagram of another modification of the first embodiment.

In another modification of the first embodiment of the present invention shown in FIG. 2, no heat exchanger is disposed in a crystallizer tank 1', and the interior of the crystallizer tank 1' communicates with an external heat exchanger 12' through a water conduit 16'. Chilled water in the crystallizer tank 1' is fed by a chilled water pump to the external heat exchanger 12' for heat exchange with water supplied to an air-conditioner coil. Reference numeral 4' designates a conventional expansion device.

Figure 3:
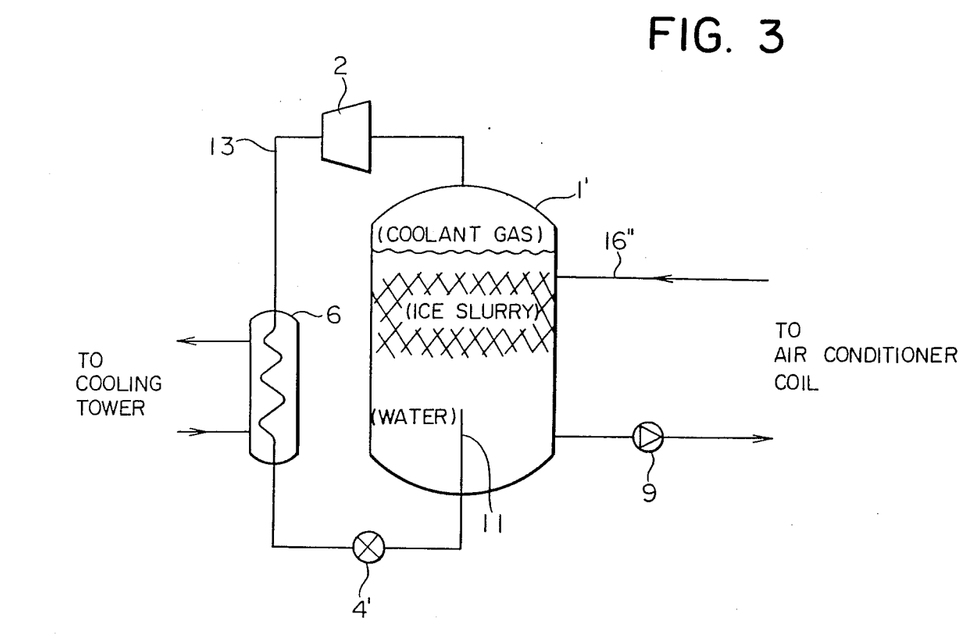
FIG. 3 is a system diagram of still another modification of the first embodiment.

In still another modification shown in FIG. 3, the heat exchanger 12' provided in the modification shown in FIG. 2 is eliminated, and chilled water in the crystallizer tank 1' is directly circulated to the air-conditioner coil through a water conduit 16''.

Figure 4:
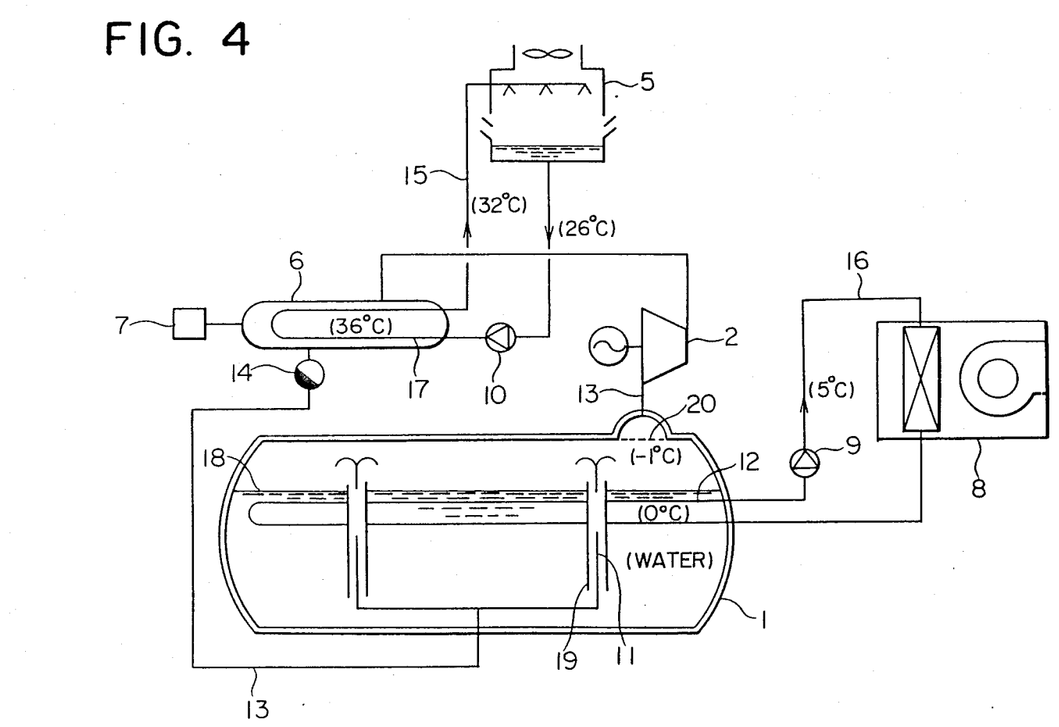
FIG. 4 is a system diagram of a second embodiment of the ice storage refrigerating apparatus of the present invention.

In a second embodiment of the present invention shown in FIG. 4, refrigerant jet nozzles 11 open in pipes 19 provided in a crystallizer tank 1. These pipes 19 are vertically disposed in the crystallizer tank 1. In the illustrated embodiment, the upper end of each of these pipes 19 terminates at a position slightly above the water level 17, and the lower end terminates at a position in a lower inner part of the crystallizer tank 1.

Water and a refrigerant are contained in the crystallizer tank 1, but air is excluded from within the crystallizer tank 1.

During ice making, the internal pressure of the crystallizer tank 1 is maintained by the function of a compressor 2 at a saturated value corresponding to a temperature slightly lower than the freezing point of water (for example, 175 Torr=23 kPa) at −1° C. in the case of n-pentane). Strictly, the value of saturated pressure of water vapor corresponding to the water temperature (about 5 Torr=700 Pa) is added to the above value.

Refrigerant gas (containing a small quantity of water vapor) is compressed by the compressor 2 (of oil-free type), and its temperature is raised. The compressed refrigerant gas is then cooled by a condenser 6 (for example, about 760 Torr=101 kPa in the case of n-pentane at 36° C.) and liquefied.

The liquefied refrigerant is expanded by a gas trap 14 (a kind of an expansion device), and its pressure is reduced. In this case, part of the refrigerant flashes, and the refrigerant turns into a gas-liquid mixture having a dryness of about 0.2. When the refrigerant in such a state is forcedly introduced into water from the refrigerant jet nozzles 11, the water is turned into ice of slurry or sherbet form. The quantity of the generated ice is sensed by some suitable means (for example, by means sensing the rise of the water level 17), and the operation of the compressor 2 is stopped. The ice in the slurry or sherbet form thus produced is stored (ice storage) to be used for cooling, etc.

This second embodiment is featured by the presence of the pipes 19 into which the nozzles 11 extend and which have upper and lower open ends as described above. The refrigerant ejected from the nozzles 11 raises the water level by the principle of an air lift pump and also by the suction function like that of a jet stream pump. The refrigerant then flows out from the upper end of the pipes 19 while forming particles of ice by vaporization of the refrigerant. The portion of water which has not been turned into ice flows downward toward the bottom of the tank 1 while percolating through the ice slurry and is sucked again into the pipes 19 which act as risers. In this manner, the quantity of ice increases gradually from the upper part toward the bottom part of the tank 1, and water is supplied from the bottom part of the tank 1. Thus, it has become possible to continue the ice making operation without the prior art necessity for removal of ice slurry.

In the case of a refrigerant having a specific weight larger than that of water (for example, 1.5 to 1.6 kg/l in the case of R114 or C318), accumulation of an unvaporized portion of the refrigerant on the bottom of the tank poses a problem. In the embodiment of the present invention shown in FIG. 4, such an unvaporized portion of the refrigerant can be sucked up and vaporized through the pipes 19 which act as the risers.

Figure 5:
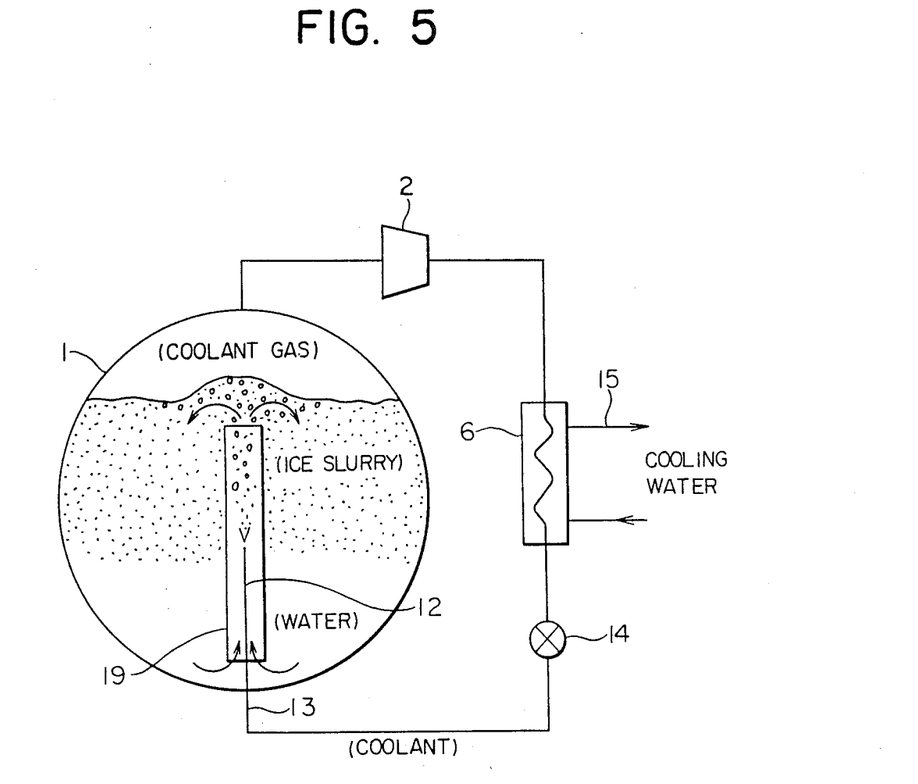
FIG. 5 is a sectional view of part of a modification of the second embodiment.

The sectional shape of the pipes 19 may be circular or square. The upper end of the pipes 19 may be exposed above the wate level as shown in FIG. 4 or may be submerged in the water as shown in FIG. 5 which illustrates a modification. Further, since the water level in the tank 1 rises with the increase in the quantity of ice, the upper end of the pipes 19 exposed above the water level at the beginning of the ice making operation may be submerged in the water at the end of the ice making operation.

The refrigerant ejected from the nozzles 11 in the pipes 19 may be emitted from the upper end of the pipes 19 and mixed with water and ice, and part of the fluid mixture consisting of the refrigerant, water and ice may be sucked into the compressor 2 as mist. This is not desirable from the aspects of durability and performance of the compressor 2.

In order to prevent suction of such mist into the compressor 2, it is effective to divert the flow of th liquid mixture so that the mixture flows out from the upper end of the pipes 11 in a lateral direction instead of flowing out upward. Also, an eliminator 20 may be provided at the tank outlet as shown in FIG. 4.

Figure 6:
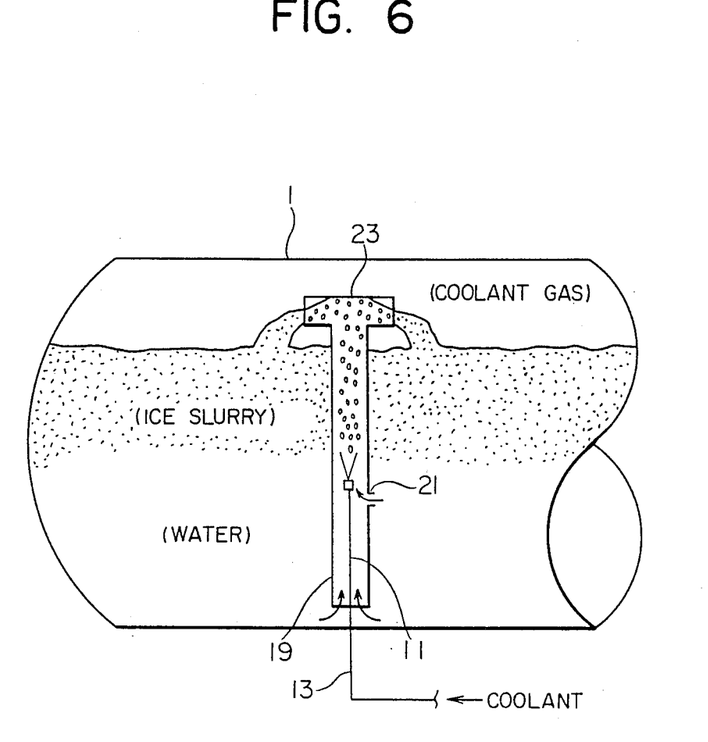
FIG. 6 is a sectional view of part of another modification of the second embodiment.

In a modification shown in FIG. 6, each of the pipes 19 has a T-shaped upper end 23 having lateral openings for distributing the flow into two directions. It is apparent that the direction of distribution is in no way limited to two.

Figure 7A:
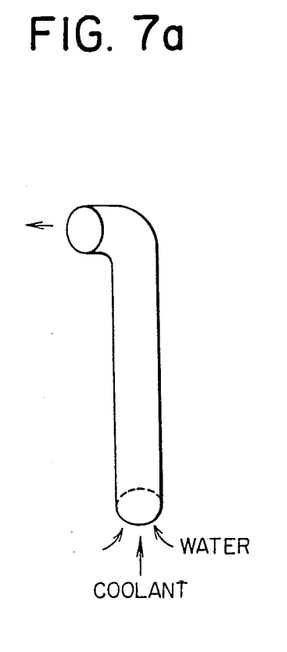
FIG. 7a is a perspective view showing a modification of the pipe shown in FIG. 6.
Figure 7B:
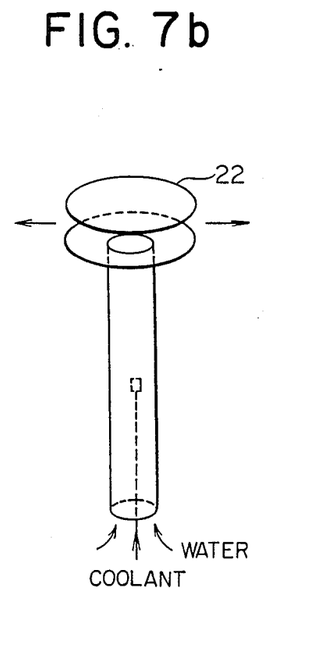
FIG. 7b is a perspective view showing another modification of the pipe.

For example, the effect similar to that described above is attained by employing an elbow structure as shown in FIG. 7a or by providing a baffle plate 22 above the upper end of the pipe.

Further, in order to prevent overcooling of water and to ensure smooth production of ice, a seed crystal introduction port 21 may be provided midway of each of the pipes 19 as shown in FIG. 6, and part of ice crystallized already may be introduced into the pipe 19 as seed crystals.

Figure 8:
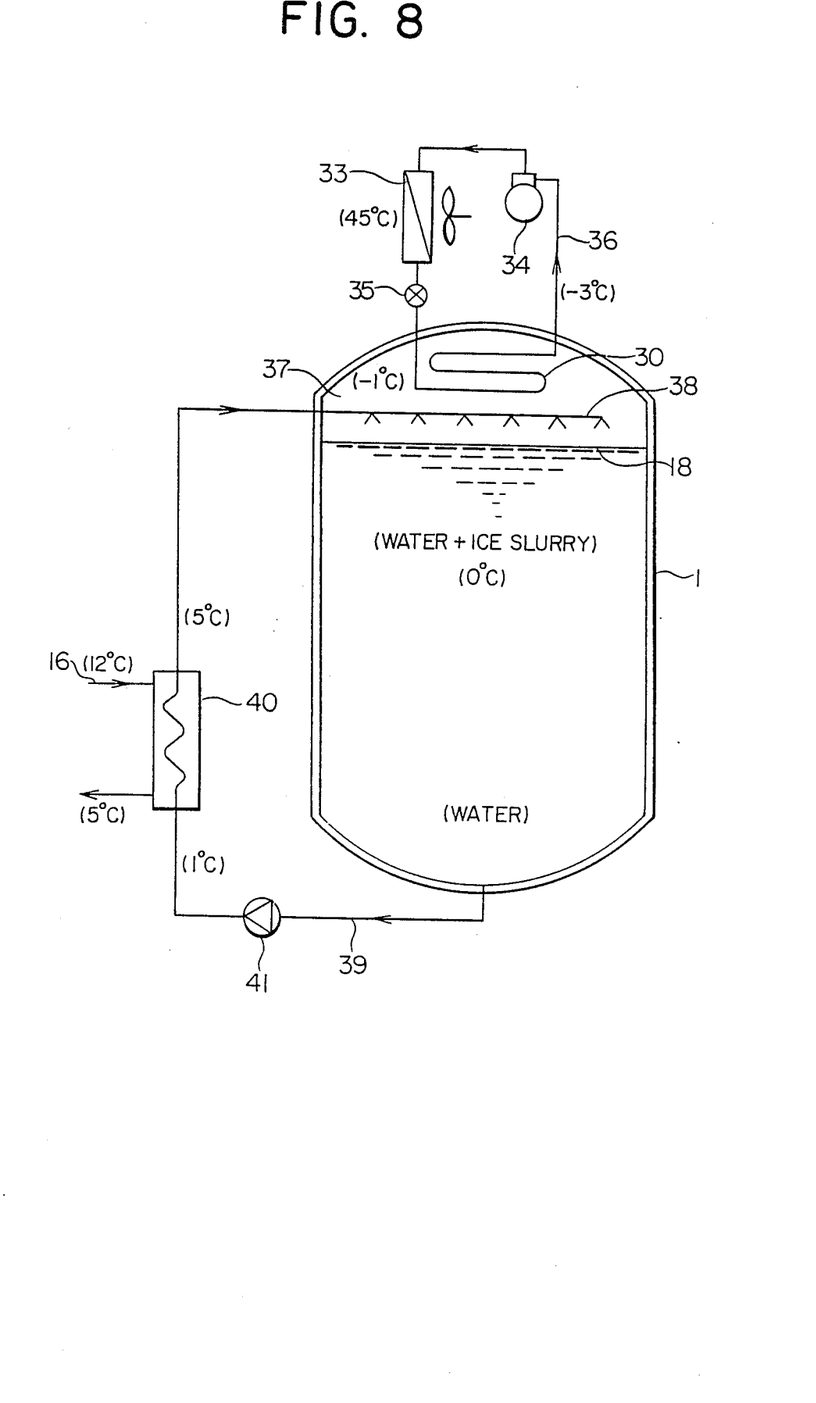
FIG. 8 is a system diagram of a third embodiment of the apparatus of the present invention.

FIG. 8 shows a third embodiment of the present invention. Referring to FIG. 8, water and a refrigerant which is substantially insoluble to water are enclosed in a crystallizer tank 1 which is gastight and thermally insulated. The reference numeral 18 designates the water level in the tank 1, and an upper space 37 defined above this water level 18 in the tank 1 is filled with enclosed refrigerant gas and water vapor. A condenser 30 for condensing the enclosed refrigerant is disposed in this upper space 37. A conduit extends gastight from this condenser 30 to the exterior of the crystallizer tank 1 to provide a Freon conduit 36 which is led through a Freon compressor (or a heat pump) 34 and passes then through an expansion valve 35 from a Freon condenser 33 to return to the tank-enclosed refrigerant condenser 30. This tank-enclosed refrigerant condenser 30 acts also as a Freon evaporator.

A water conduit 39 is led out from the bottom of the crystallizer tank 1 and passes through a water circulating pump 41 and a coolness-deriving heat exchanger 40 to communicate with a sprinkler device 38 disposed above the water level 18 in the upper space 37 of the crystallizer tank 1.

Figure 9:
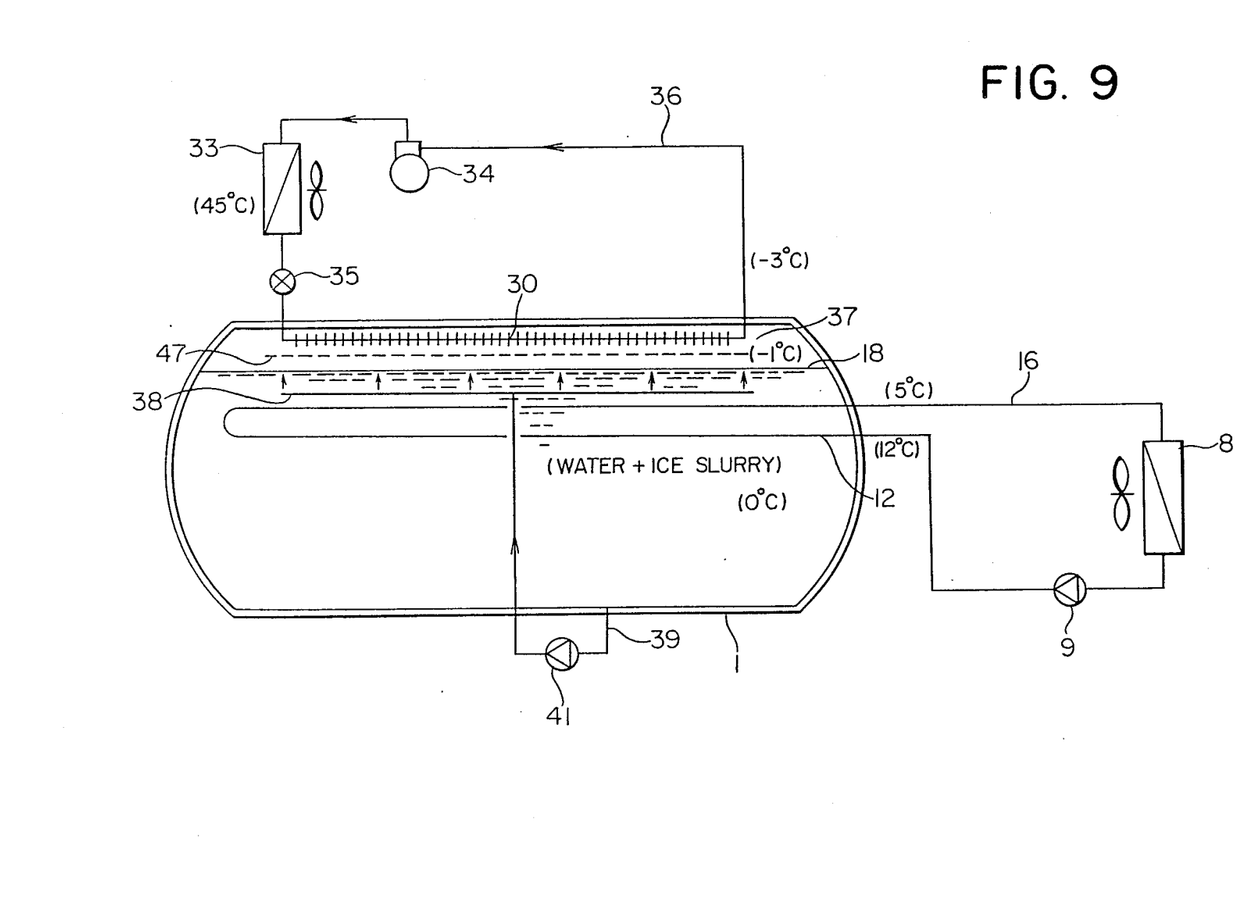
FIG. 9 is a system diagram of a modification of the third embodiment.

FIG. 9 shows a modification of the third embodiment, and the same reference numerals are used to designate the same or equivalent parts appearing in FIG. 8 to dispense with any detailed explanation of such parts. This modification differs from the third embodiment in that the sprinkler device 38 is disposed beneath the water level 18; a perforated baffle plate 47 is disposed between the water level 18 and the tank-enclosed refrigerant condenser 30; and a chilled water heat exchanger 12 is separately disposed in the crystallizer tank 1, without provision of the water conduit 39 and the coolness-deriving heat exchanger 40, this chilled water heat exchanger 12 being connected to a coolness deriving system consisting of a chilled water conduit 16, an air conditioner 8 and a chilled water pump 9 disposed outside of the crystallizer tank 1.

The operation of the third embodiment and its modification will now be described.

It is the fundamental arrangement of the embodiment shown in FIG. 8 that the tank-enclosed refrigerant condenser 30 cooled by the external refrigerator (33, 34, 35, 36) is disposed in the upper space 37 of the gastight crystallizer tank 1, and the refrigerant in liquid form dropping from the condenser 30 is mixed on the water level 18 with water pumped out from the bottom part of the crystallizer tank 1 and sprinkled from the sprinkler device 38 thereby producing ice in sherbet form.

When the condenser 30 is cooled by the Freon of, for example, $-3°$ C., the temperature of the refrigerant gas on the water level can be maintained at $-1°$ C. under the saturation pressure even when the thermal resistance of the condenser 30 is taken into account. The liquid refrigerant vaporizes vigorously by depriving heat from the water ($0°$ C.) thereby producing ice in sherbet foam.

The ice in sherbet form thus produced is lighter than water and forms a layer on the water level 18. As the ice making operation continues, the ice layer is forced upward by a new layer of ice, and the portion of water which has not been turned into ice percolates through the ice particles and flows down toward the tank bottom to be pumped out from the bottom part of the tank again.

The above operation is substantially similarly carried out in the modification shown in FIG. 9. However, in this modification, the liquid refrigerant dropping from the tank-enclosed refrigerant condenser 30 is received once on the perforated baffle plate 47 and then drops through the perforations of the perforated baffle plate 47. On the other hand, the sprinkler device 38 is disposed beneath the water level 18 and sprinkles water upward to disturb the water level 18 thereby enhancing the chance of heat exchange between the water and the tank-enclosed refrigerant.

The external refrigerator is in no way limited to that using Freon as its refrigerant. For example, an electric refrigerator, an absorption refrigerator or the like using ammonia as its refrigerant may be employed. Therefore, the cooling fluid used in the tank-enclosed refrigerant condenser is in no way limited to the Freon and may be brine (for example, an aqueous solution of ethylene glycol) cooled by a refrigerator.

The foregoing description has specifically referred to ice making, and a clathrate has not been referred to.

However, the present invention is directly applicable to utilization of a clathrate for cool storage. Suppose, for example, that the enclosed refrigerant is R11, and its quantity is about 30% by weight of the total quantity of water. The specific weight of the liquid R11 (1.5 kg/l at 0° C.) is larger than that of water, and the liquid R11 accumulates on the bottom part of the tank. Thus, the circulating pump pumps out the liquid Freon, and the sprinkler device 38 sprinkles it instead of water.

In principle, a clathrate is to be produced when the R11 condenser is cooled to a temperature lower than 8.3° C.

The specific weight of the clathrate thus produced is about 1.15 kg/l and is larger than that of water but smaller than that of the liquid R11. Therefore, the clathrate precipitates on the boundary between the water and the liquid R11.

I claim:

1. An ice storage refrigerating apparatus of direct contact type comprising a gastight crystallizer tank enclosing therein water and a refrigerant substantially insoluble to the water, a condenser disposed in an upper space of said crystallizer tank and cooled by an external refrigerator for condensing said refrigerant, and sprinkler means disposed in said upper space for sprinkling the liquid pumped out from the bottom part of said crystallizer tank and fed through conduit means, said refrigerant dropping in liquid form from said condenser and said liquid pumped out from the bottom part of said crystallizer tank being mixed together on the liquid level in said crystallizer tank to form ice in particle form.

2. An ice storage refrigerating apparatus of direct contact type according to claim 1, wherein a heat exchanger for deriving coolness is disposed midway of said conduit means through which said liquid pumped out from the bottom part of said crystallizer tank is fed to said sprinkler means.

3. An ice storage refrigerating apparatus of direct contact type according to claim 2, wherein the open upper end of said conduit means is located so that it is exposed above the water level at the beginning of ice making operation but is submerged in the water at the end of the ice making operation.

4. An ice storage refrigerating apparatus of direct contact type according to claim 2, wherein a seed crystal introduction port is provided at a suitable position of said conduit means.

5. An ice storage refrigerating apparatus of direct contact type according to claim 1, wherein said sprinkler means is disposed beneath said condenser but above the liquid level in said crystallizer tank.

6. An ice storage refrigerating apparatus of direct contact type according to claim 1, wherein said sprinkler means is disposed beneath the liquid level in said crystallizer tank.

7. An ice storage refrigerating apparatus of direct contact type according to claim 6, wherein baffle means is disposed between said condenser and the liquid level in said crystallizer tank.

8. An ice storage refrigerating apparatus of direct contact type according to claim 7, wherein a chilled water heat exchanger for deriving coolness is independently disposed in said crystallizer tank.

9. An ice storage refrigerating apparatus of direct contact type according to claim 6, wherein the open upper end of said conduit means is shaped in the form of a T having lateral openings.

* * * * *